(12) United States Patent
Franzen et al.

(10) Patent No.: US 12,708,064 B2
(45) Date of Patent: Aug. 18, 2026

(54) VEHICLE HAVING A LATERALLY ADJUSTABLE CHASSIS AND METHODS OF OPERATING SUCH A VEHICLE

(71) Applicant: AGCO Corporation, Duluth, GA (US)

(72) Inventors: Cody Evan Franzen, Jackson, MN (US); Steven Henry Rogotzke, Jackson, MN (US); Adam Joseph LeMay, Jackson, MN (US)

(73) Assignee: AGCO Corporation, Duluth, GA (US)

(*) Notice: Subject to any disclaimer, the term of this patent is extended or adjusted under 35 U.S.C. 154(b) by 961 days.

(21) Appl. No.: 17/820,284

(22) Filed: Aug. 17, 2022

(65) Prior Publication Data

US 2023/0095974 A1 Mar. 30, 2023

Related U.S. Application Data

(60) Provisional application No. 63/261,914, filed on Sep. 30, 2021.

(51) Int. Cl.

*A01B 63/02* (2006.01)
*A01M 7/00* (2006.01)
*B60G 3/01* (2006.01)
*B60G 17/016* (2006.01)

(52) U.S. Cl.

CPC ......... *A01B 63/026* (2013.01); *A01M 7/0042* (2013.01); *B60G 3/01* (2013.01); *B60G 17/016* (2013.01); *B60G 2202/413* (2013.01); *B60G 2300/083* (2013.01)

(58) Field of Classification Search

CPC ..... A01B 63/00; A01B 63/002; A01B 63/008; A01B 63/026; A01B 63/045; A01M 7/0025; A01M 7/0042; B60G 3/01; B60G 17/016; B60G 2202/413; B60G 2300/083

USPC ........... 172/395, 407, 411, 415, 421; 17/421

See application file for complete search history.

(56) References Cited

U.S. PATENT DOCUMENTS 3,899,037 A * 8/1975 Yuker .............. B60G 17/01925 180/41
9,180,747 B2 * 11/2015 Slawson ................ A01B 76/00
10,730,359 B2 8/2020 Bittner et al.
2006/0170176 A1 8/2006 Wubben et al.
2009/0194984 A1 * 8/2009 White ................ B62D 49/0678 280/781
2019/0176559 A1 6/2019 Bittner et al.
2019/0357520 A1 11/2019 Redden et al.

(Continued)

FOREIGN PATENT DOCUMENTS

FR 2460438 A2 1/1981

OTHER PUBLICATIONS

UK Intellectual Property Office, Search report for related UK Application No. GB2114451.4, dated Feb. 1, 2022.

*Primary Examiner* — Christopher J Sebesta
*Assistant Examiner* — Evan A Bregel

(57) ABSTRACT

A vehicle includes a chassis, ground-engaging elements configured to support the chassis, support assemblies supporting the chassis on the ground-engaging elements, adjustable axles configured to change a lateral distance from the chassis to each of the support assemblies, and a controller configured to move the chassis laterally along the axles without changing a track width between ground-engaging elements on opposing sides of the chassis. Disclosed methods may be used to remove and install application systems on the vehicle.

15 Claims, 7 Drawing Sheets

(56) References Cited

U.S. PATENT DOCUMENTS

| | | | | |
|---|---|---|---|---|
| 2020/0122540 | A1* | 4/2020 | Rife, Jr. | B62D 55/116 |
| 2020/0130741 | A1 | 4/2020 | Crowley et al. | |

* cited by examiner 426
428
428
428
428

418
404
416
414
422
420
404
424
412
412
410
408
406
404
404

402
404
414
416
404
412
410
412
408
406
404
404

VEHICLE HAVING A LATERALLY ADJUSTABLE CHASSIS AND METHODS OF OPERATING SUCH A VEHICLE

CROSS-REFERENCE TO RELATED APPLICATIONS

This application claims the benefit of the filing date of U.S. Provisional Patent Application 63/261,914, "Vehicle Having a Laterally Adjustable Chassis and Methods of Operating Such a Vehicle," filed Sep. 30, 2021, the entire disclosure of which is incorporated herein by reference.

The subject matter of this application is related to the subject matter of U.S. patent application Ser. No. 17/817,377, "Vehicle Having a Laterally Adjustable Chassis and Methods of Servicing Such a Vehicle," filed Aug. 4, 2022, the entire disclosure of which is incorporated herein by reference.

FIELD

Embodiments of the present disclosure relate to mobile machines, such as self-propelled agricultural machines and similar vehicles. More particularly, embodiments relate to mobile machines with an adjustable track width.

BACKGROUND

Some vehicles are configured to be operated in fields among row crops. Application machines such as self-propelled sprayers, for example, may have wheels configured to pass between crop rows and a spray boom that extends outwardly from the vehicle to spray the crop as the machine travels through the field. To avoid damaging the crops as the vehicle moves through the field, each of the wheels must have the proper width to travel between the rows, and the track width—the lateral distance between the wheels—must match row spacing so that the wheels are properly positioned between crop rows. Furthermore, the vehicle should have sufficient ground clearance (the distance between the vehicle body and the surface over which it moves) to clear the crops.

U.S. Pat. No. 9,180,747, "System and Method of Adjusting the Chassis Height of a Machine," granted Nov. 10, 2015, discloses a self-propelled sprayer having a chassis-height adjustment system in which four wheel-support assemblies are configured to selectively raise and lower the chassis relative to the ground surface by actuators. Adjustment of the chassis height in such known systems is commanded by an operator through user interface elements. The operator may thus raise and lower the chassis as required. For example, during filling, on the highway, or in crop fields with short crops, a low ground clearance may be selected. Conversely, for operating in taller crops, a higher ground clearance may be selected. In general, during operation in crop fields, selecting the lowest possible chassis height that avoids damaging the crop canopy is desirable to maintain the center of mass as low as possible for stability.

Self-propelled sprayers are typically operated over various terrain, including slopes and hills. When a chassis is in a high-clearance position, sprayers have a higher center of gravity, and are thus less stable in comparison to a low-clearance position.

BRIEF SUMMARY

Some embodiments include a method of operating a vehicle comprising a chassis, a plurality of ground-engaging elements configured to support the chassis above a ground surface, and a plurality of support assemblies supporting the chassis on the ground-engaging elements. The method includes detecting an orientation of the chassis relative to gravity, and laterally translating the chassis relative to the support assemblies based on the detected orientation of the chassis without changing a track width of the ground-engaging elements.

The orientation may be detected with a level sensor, an inertial sensor, or by any other selected sensor. In some embodiments, the orientation may be detected based on GPS signals or other location information.

Laterally translating the chassis may be performed by extending axles on a first side of the chassis while retracting axles on a second, opposite side of the chassis.

In some embodiments, the method includes transmitting a command from a control panel to a controller. The control panel may be located at location selected from the group consisting of inside an operator cab, on an exterior of the chassis, and in a mobile device.

In certain embodiments, laterally translating the chassis includes moving a center of gravity of the vehicle toward a midpoint between the ground-engaging elements (e.g., by moving toward an up-slope side of the vehicle).

In yet other embodiments, the method includes adjusting height-adjustment actuators associated with the support assemblies to raise or lower the chassis.

In another embodiment, a vehicle includes a chassis, a plurality of ground-engaging elements configured to support the chassis above a ground surface, a plurality of support assemblies supporting the chassis on the ground-engaging elements, a plurality of adjustable axles configured to change a lateral distance from the chassis to each of the support assemblies, at least one sensor configured to detect an orientation of the chassis relative to gravity, and a controller. The controller is configured to receive a signal from the sensor correlated to the orientation and to move the chassis laterally along the axles responsive to the signal without changing a track width between ground-engaging elements on opposing sides of the chassis.

The vehicle may optionally include an application system carried by the chassis. For example, the application system may have a liquid holding tank and a plurality of nozzles spaced along a boom. The nozzles may be configured to deliver liquid from the liquid holding tank to the ground surface.

In some embodiments, the controller is configured to automatically move the chassis laterally along the axles after receiving the signal from the at least one sensor. The controller may be configured to move the chassis laterally while the support assemblies remain stationary.

In some embodiments, each support assembly includes a height-adjustment actuator. Each height-adjustment actuator may include a hydraulic cylinder, and the hydraulic cylinders may be connected to a common fluid source via a respective control valve.

Another embodiment includes a non-transitory computer-readable storage medium including instructions that when executed by a computer associated with a vehicle comprising a chassis, a plurality of ground-engaging elements supporting the chassis above a ground surface, and a plurality of support assemblies supporting the chassis on the ground-engaging elements, cause the vehicle to detect an orientation of the chassis relative to gravity, and laterally translate the chassis relative to the support assemblies based on the detected orientation of the chassis without changing a track width of the ground-engaging elements.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

Figure 1:
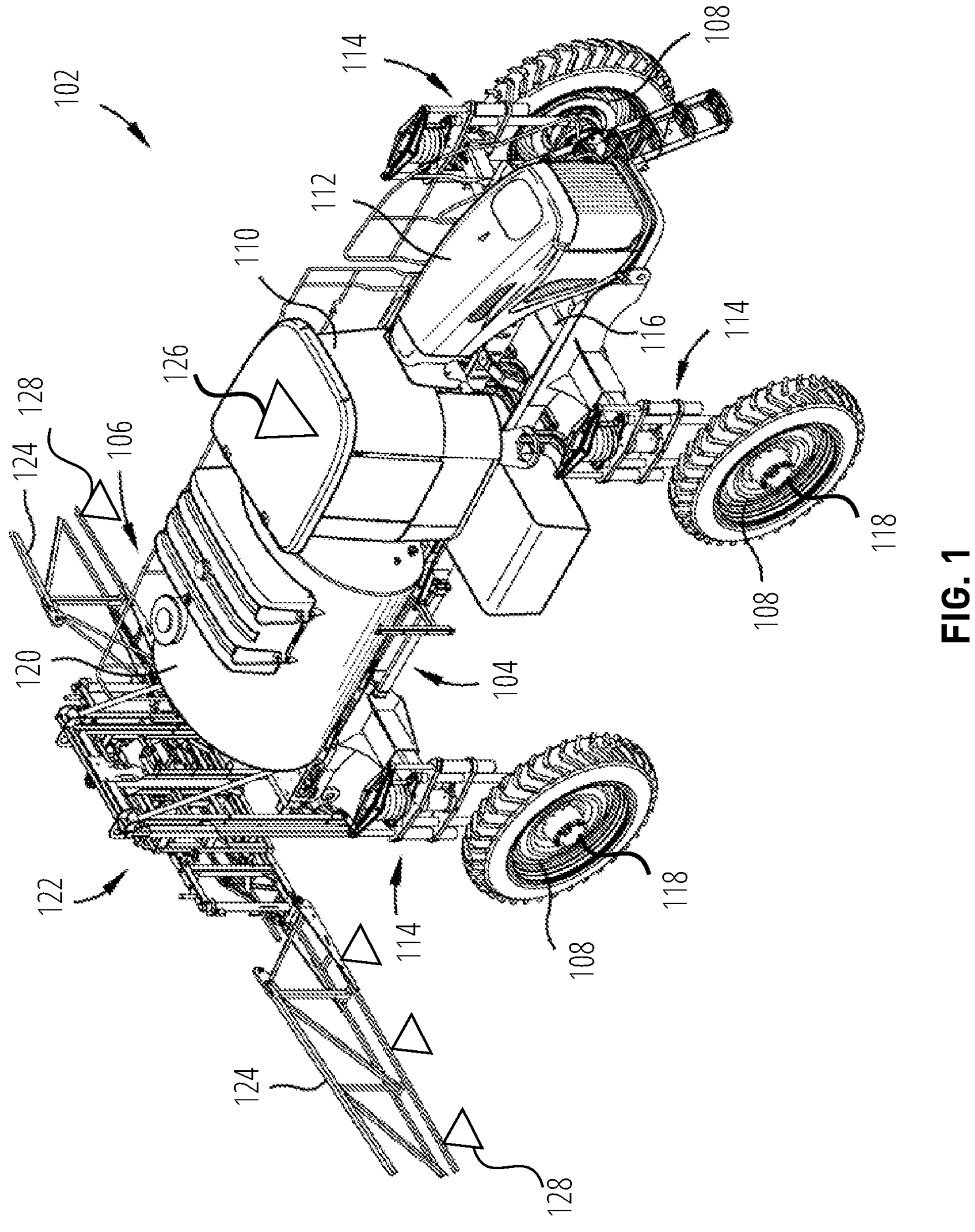
FIG. 1 is a perspective view of an agricultural applicator constructed and operable in accordance with principles disclosed herein.

The illustrations presented herein are not actual views of any vehicle or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms “comprising,” “including,” “containing,” “characterized by,” and grammatical equivalents thereof are inclusive or open-ended terms that do not exclude additional, unrecited elements or method steps, but also include the more restrictive terms “consisting of” and “consisting essentially of” and grammatical equivalents thereof.

As used herein, the term “may” with respect to a material, structure, feature, or method act indicates that such is contemplated for use in implementation of an embodiment of the disclosure, and such term is used in preference to the more restrictive term “is” so as to avoid any implication that other, compatible materials, structures, features, and methods usable in combination therewith should or must be excluded.

As used herein, the term “configured” refers to a size, shape, material composition, and arrangement of one or more of at least one structure and at least one apparatus facilitating operation of one or more of the structure and the apparatus in a predetermined way.

As used herein, the singular forms following “a,” “an,” and “the” are intended to include the plural forms as well, unless the context clearly indicates otherwise.

As used herein, the term “and/or” includes any and all combinations of one or more of the associated listed items.

As used herein, spatially relative terms, such as “beneath,” “below,” “lower,” “bottom,” “above,” “upper,” “top,” “front,” “rear,” “left,” “right,” and the like, may be used for ease of description to describe one element’s or feature’s relationship to another element(s) or feature(s) as illustrated in the figures. Unless otherwise specified, the spatially relative terms are intended to encompass different orientations of the materials in addition to the orientation depicted in the figures.

As used herein, the term “substantially” in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term “about” used in reference to a given parameter is inclusive of the stated value and has the meaning dictated by the context (e.g., it includes the degree of error associated with measurement of the given parameter).

FIG. 1 illustrates a vehicle 102 having an adjustable track width and chassis height. In particular, the vehicle 102 is pictured as an agricultural material applicator including a chassis 104, an application system 106, a plurality of wheels 108 or other ground-engaging elements supporting the chassis 104 above a ground surface, an operator cabin 110, and an engine compartment 112. A plurality of support assemblies 114 interposed between the wheels 108 and the chassis 104 support the chassis 104 on the wheels 108 and provide suspension, height adjustment, and/or steering functions, as discussed in greater detail below. The vehicle 102 may also have a sensor 126 for detecting an orientation of the vehicle 102 relative to gravity (e.g., whether the vehicle 102 is traveling up or down a slope, or on a side-hill).

Certain components of the vehicle 102 have been omitted from the figures for simplicity of illustration and to show certain features of the vehicle 102 that would otherwise be concealed. The engine, for example, has been omitted to illustrate components of the vehicle frame, including portions of the front axle 116. Certain hydraulic lines, such as hydraulic lines running to and from the support assemblies 114, are also omitted. The vehicle 102 is illustrated and discussed herein as an exemplary machine with which the support assemblies 114 may be used. U.S. Pat. No. 9,180,747, “System and Method of Adjusting the Chassis Height of a Machine,” granted Nov. 10, 2015, discloses a number of different support assembly configurations that may be used.

The vehicle 102 includes a pair of front wheels 108 and a pair of rear wheels 108 (one rear wheel 108 hidden from view) of the appropriate size and shape to allow the vehicle 102 to travel among row crops with minimal crop disturbance. A used herein, a "wheel" includes an inner, rigid wheel and an outer, flexible tire mounted on the inner wheel, unless otherwise specified. Each wheel 108 may exhibit, for example, an outer diameter of between 60 inches (152 cm) and 85 inches (216 cm) and a width of between 10 inches (25.3 cm) and 25 inches (63.5 cm). More specifically, wheels 108 designed for use with row crops may exhibit an outer diameter of about 70 inches (178 cm) or about 80 inches (203 cm) and a width of about 15 inches (38.1 cm). Alternatively, the wheels 108 may exhibit a width of up to 25 inches (63.5 cm) (or more) for pre-emergent applications, for use on soft terrain, or both to maximize flotation and minimize soil compaction. Each of the wheels 108 may weigh between 600 pounds (272 kg) and 1,000 pounds (454 kg) and may specifically weigh about 700 pounds (318 kg) or about 800 pounds (363 kg). In one exemplary embodiment, each of the wheels 108 is about 70 inches (178 cm) tall, about 15 inches (38.1 cm) wide, and weighs about 700 pounds (318 kg).

The particular size, shape, and configuration of the wheels 108 may vary substantially from one embodiment to another. In some embodiments, the vehicle 102 may include ground-engaging elements other than wheels, such as tracks, skis, etc. Hereinafter, reference will be made to a "wheel 108" or "wheels 108" with the understanding that the illustrated wheels 108 may be replaced with other types of ground-engaging elements.

The application system 106 is supported on the chassis 104 and may be useful for distributing liquids or solids. In the illustrated embodiment, the application system 106 includes a liquid holding tank 120 and a delivery system 122 for applying a liquid from the liquid holding tank 120 to a crop or field. The liquid holding tank 120 may have a capacity of between 200 gallons (757 l) and 2,000 gallons (7,570 l) and, more specifically, may have a capacity of 700 gallons (2,650 l), 900 gallons (3,410 l), 1,100 gallons (4,160 l), or 1,300 gallons (4,920 l). The delivery system 122 includes a laterally extending boom 124 supporting hoses, pumps, and spray nozzles 128 or similar components for dispersing or otherwise delivering the contents of the liquid holding tank 120 to a crop. The boom 124 may be configured to fold for transport. In some embodiments, the application system 106 may be configured to apply dry (i.e., solid) particulate material to a field and therefore may include a solid product hopper and a solid material spreader for dispersing particulate material from the solid product hopper, such as a pneumatic spreader or one or more spinners.

The operator cabin 110 or "cab" is supported on the chassis 104 and positioned forward of the application system 106. The operator cabin 110 presents a control environment 202, illustrated in FIG. 2, which may include a steering wheel 204, one or more pedals 206, a drive lever 208, one or more electronic instrument panels 210, and a control panel 212 including buttons, switches, levers, gauges, and/or other user interface elements. The various components of the control environment 202 enable the operator to control the functions of the vehicle 102, including driving and operating the application system 106. The various user interface elements are positioned around and proximate a seat 214 for easy access by an operator during operation of the vehicle 102. The control environment 202 may include a touchscreen display. One or both of the electronic instrument panels 210, for example, may be or include a touchscreen, or a display terminal with a touchscreen may be mounted on or near the control panel 212.

Figure 2:
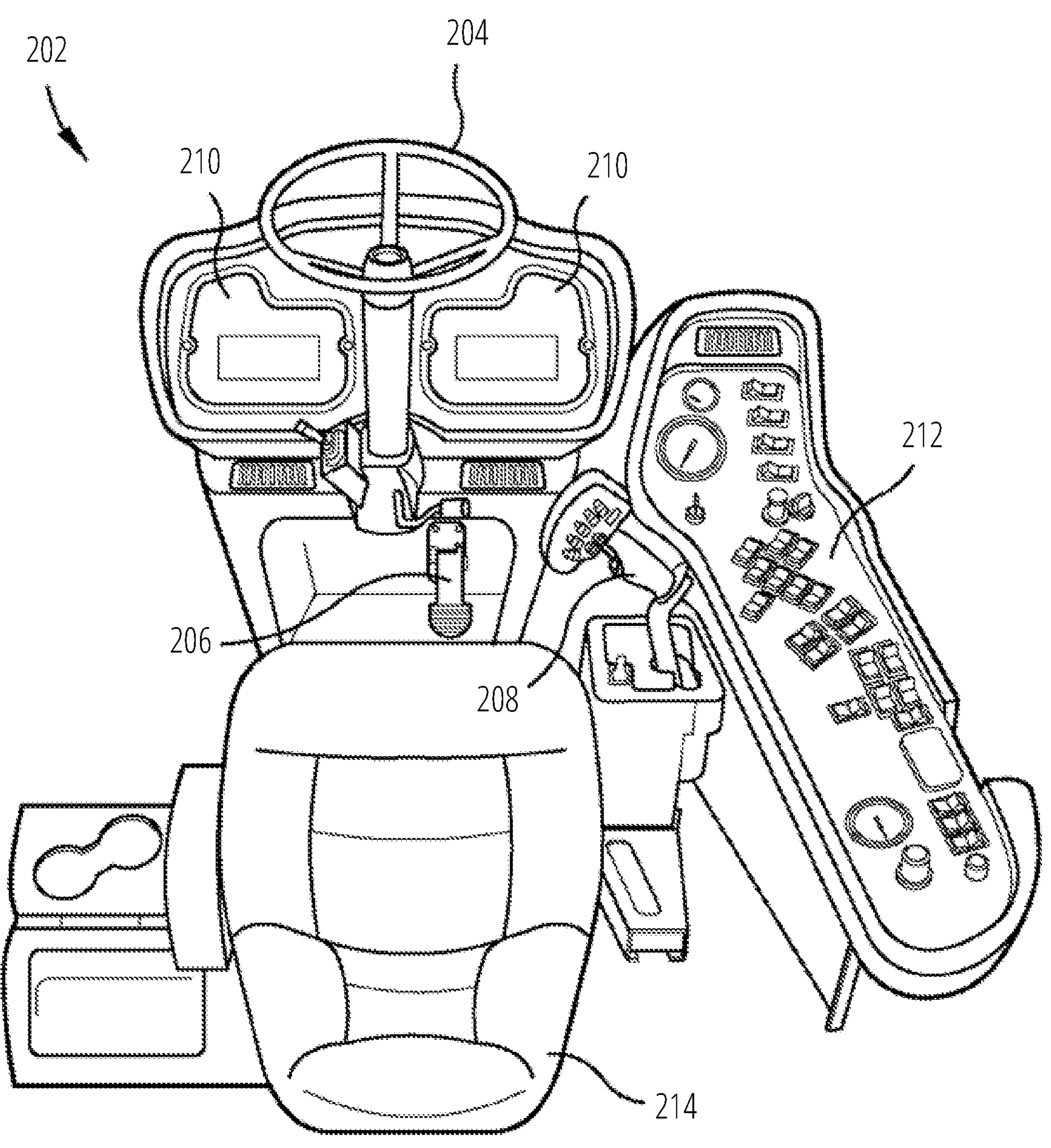
FIG. 2 illustrates certain features of a cabin of the applicator of FIG. 1 including one or more user interface elements allowing an operator to control the applicator.
Figure 3:
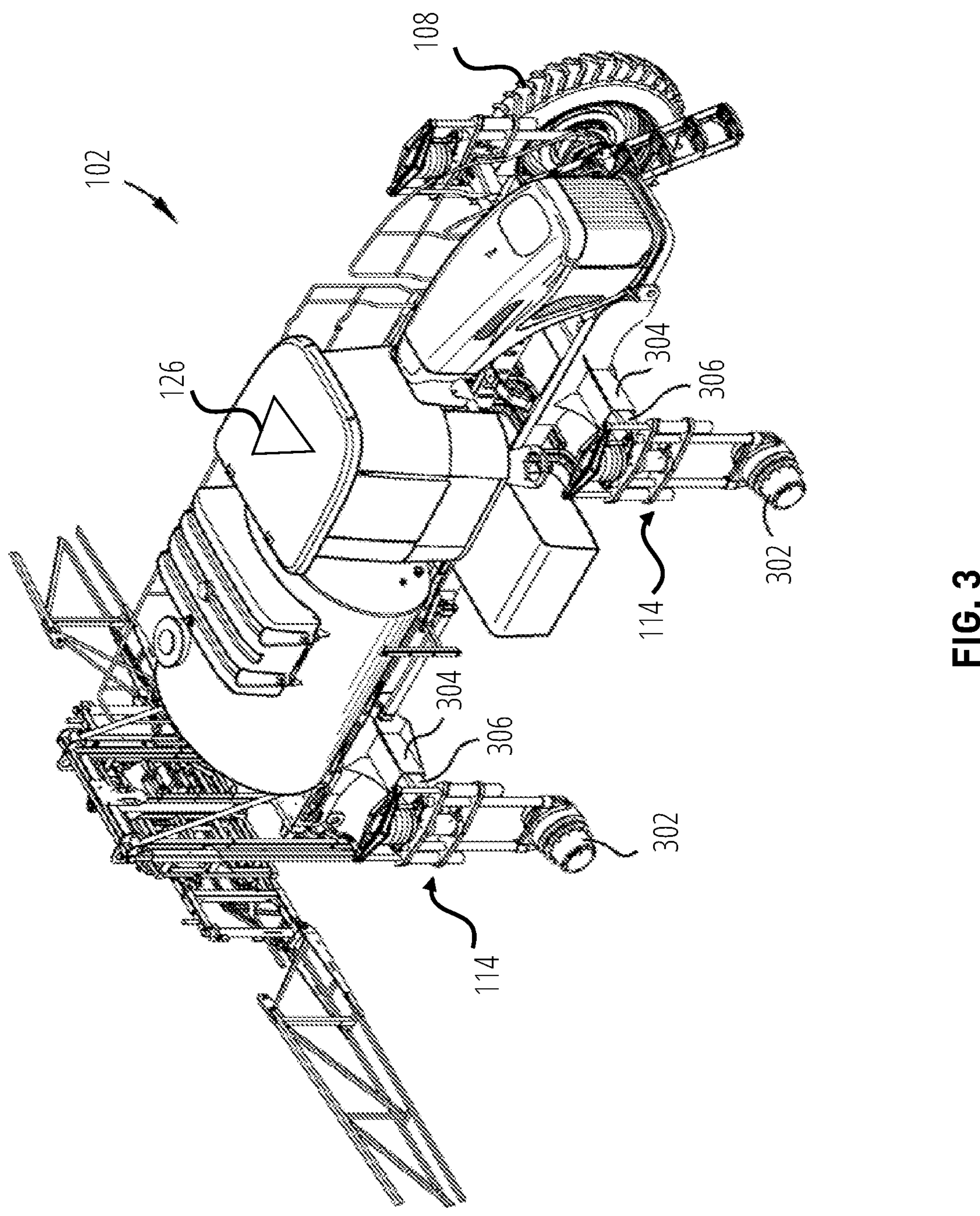
FIG. 3 is a perspective view of the agricultural applicator of FIG. 1 with two of the wheels omitted to more fully illustrate support assemblies interposed between the wheels and the chassis.

FIG. 3 illustrates the vehicle 102 with two of the wheels 108 removed to better illustrate the support assemblies 114 and their connection to the chassis 104. One or more drive motors 302 may be associated with the wheels 108 for driving rotation of the wheels 108 relative to the chassis 104 to propel the vehicle 102 in forward and reverse directions. In the illustrated embodiment, a separate hydraulic drive motor 302 is drivingly connected to each wheel 108 such that each of the wheels 108 may be driven independently to propel the vehicle 102. Either two or all four of the wheels 108 may be steerable. In some embodiments, the steering functionality of some of the wheels 108 may be selectively enabled and disabled. By way of example, the front wheels 108 may always be steerable, and supplemental steering provided by the rear wheels 108 may be selectively enabled and disabled. An operator may control the drive motors 302 and steering functions of the wheels 108, including enabling and disabling the steering ability of certain of the wheels 108, from one or more user interface elements of the control environment 202, illustrated in FIG. 2.

The vehicle 102 may include mechanisms for adjusting the track width of the wheels 108 to accommodate, for example, different spacing needs for row crops. In the illustrated embodiment, the axles 116 may each be telescoping axles, with an outer axle 304 and an inner axle 306 associated with each wheel 108, wherein the inner axle 306 slidingly engages the outer axle 304 and allows the associated wheel 108 to shift laterally relative to the chassis 104. A hydraulic piston or similar actuator may drive the inner axle 306 inward and outward to shift the position of the wheel 108. In the illustrated embodiment, the outer axles 304 are rigidly connected to the chassis 104, such as one or more frame elements. U.S. Patent Application Publication 2020/0130741, "Mounting Assembly for a Steerable Wheel with Variable Track Width," published Apr. 30, 2020, discloses an example of a telescopic axle with an actuator disposed inside the outer axle and arranged to drive the inner axle inward and outward to shift the lateral position of the associated support assembly and wheel.

As mentioned above, the vehicle 102 includes a support assembly 114 interposed between each of the wheels 108 and the chassis 104. Each support assembly 114 connects to a hub 118 of one of the wheels 108 and to one of the inner axles 306 such that the wheel 108 and the support assembly 114 shift laterally as a single unit relative to the chassis 104 when the inner axle 306 is shifted relative to the outer axle 304 to adjust the track width of the vehicle 102. The support assemblies 114 may optionally include height-adjustment components for raising and lowering the chassis 104 between various operating positions. One or more of the support assemblies 114 (or portions thereof) may be selectively pivotable relative to the chassis 104 to steer the vehicle 102.

Figures 4A, 4B, 4C:
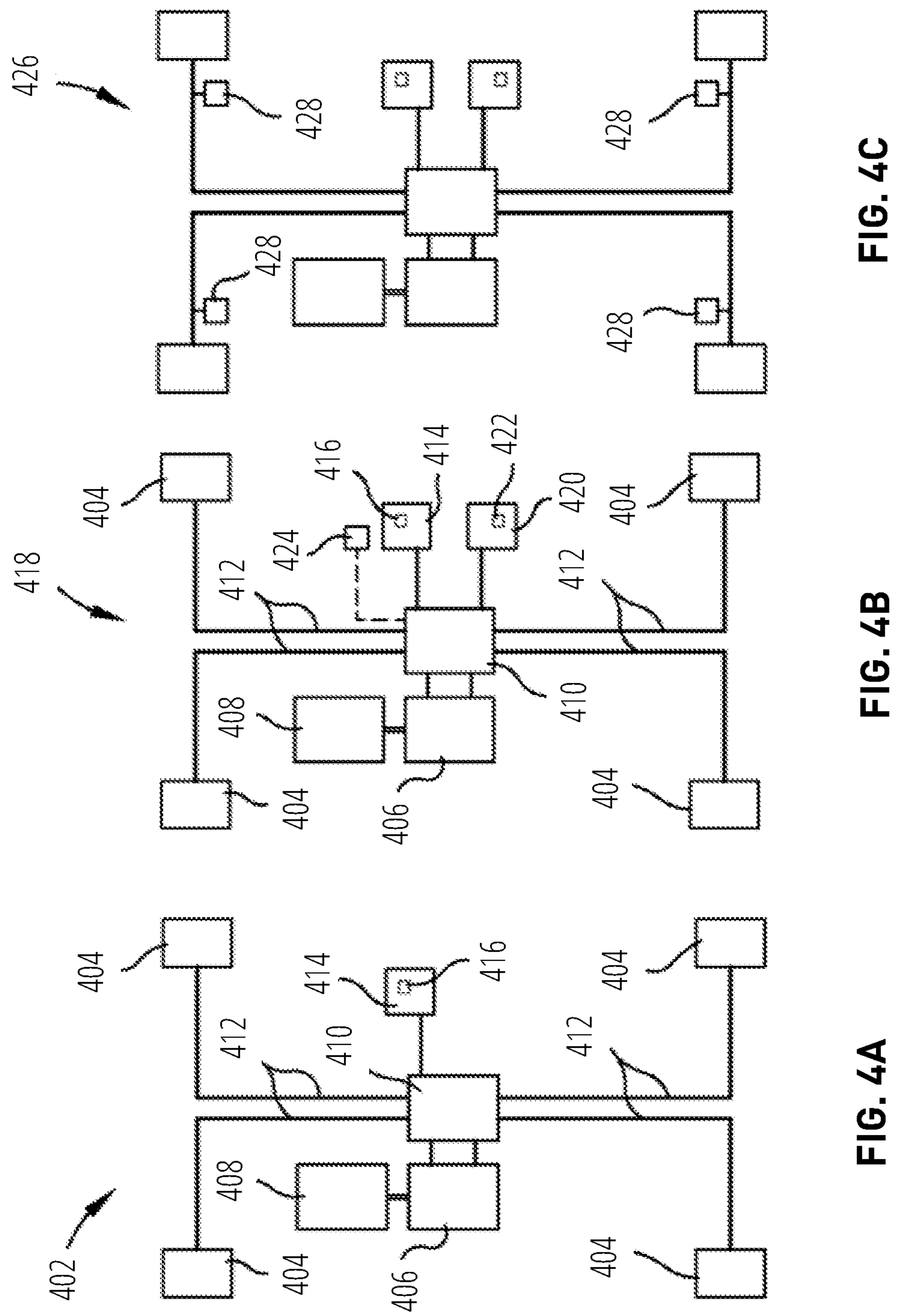
FIG. 4A, FIG. 4B, and FIG. 4C are block diagrams of various exemplary embodiments of control systems of the applicator of FIG. 1.

Each of the support assemblies 114 may include one or more actuators for adjusting a height of the chassis 104, for steering the associated wheel 108, or both. In some embodiments, the actuators are hydraulic actuators such as linear or rotary hydraulic actuators. FIG. 4A illustrates an exemplary hydraulic control system 402 for operating hydraulic actuators 404, in which a common fluid source, such as centralized hydraulic pump 406 driven by an internal combustion engine 408 or another power source, communicates pressurized hydraulic fluid to a hydraulic controller 410 that regulates fluid flow between the hydraulic pump 406 and the hydraulic actuators 404 associated with the support assemblies 114 or the axles 116 (FIG. 1) via a plurality of hydraulic transfer lines 412. The hydraulic controller 410 may include, for example, a hydraulic manifold or similar device.

Each of the hydraulic transfer lines 412 communicates hydraulic power between the hydraulic controller 410 and one or more hydraulic actuators 404 and, thus, may include one or more hydraulic pressure lines and one or more hydraulic return lines. Each of the hydraulic transfer lines 412 may communicate hydraulic power to more than one actuator 404, and each of the actuators 404 may include a group of actuators associated with each wheel 108, support assembly 114, and/or axle 116. By way of example, a first actuator 404 may drive steering of a wheel 108, a second actuator 404 may drive rotation of the wheel 108, a third actuator 404 may adjust a height of the chassis 104, and a fourth actuator 404 may control the position of the inner axle 306 relative to the outer axle 304. It will be appreciated that the actuators 404 are exemplary in nature and that the various actuators 404 may not be grouped as described herein.

The hydraulic control system 402 includes a control interface 414 in communication with the hydraulic controller 410. The control interface 414 may be part of a user interface that includes one or more physical or virtual user interface elements 416, such as buttons, switches, or dials, and may be part of the control environment 202 (FIG. 2).

Various different types of technology may be used to actuate the support assemblies 114. Though the actuators 404 are illustrated and described herein as hydraulic actuators, it will be understood that other types of actuators may be used in place of, or in connection with, the hydraulic actuators 404. By way of example, electro-mechanical actuators may be used in place of at least some of the hydraulic actuators 404 illustrated and discussed herein.

FIG. 4B illustrates another exemplary control system 418 similar to the hydraulic control system 402, but that includes a computerized controller 420 with a control module 422 for controlling the hydraulic controller 410. The control system 418 may also include a wireless interface element 424 in wireless communication with the hydraulic controller 410 to enable an operator to remotely control the actuators 404. The wireless interface element 424 may be a dedicated device, such as a device similar to a key-fob commonly used with cars and other vehicles, or a computing device such as smart phone, tablet computer, or wearable computing device programmed or configured for use with the control system 418. The wireless interface element 424 may be configured to communicate with the hydraulic controller 410 and/or the computerized controller 420 via short-range wireless communications, such as Wi-Fi or Bluetooth, or via a communications network such as a cellular network.

The controller 420 may include one or more integrated circuits programmed or configured to control the hydraulic controller 410 to actuate the support assemblies 114. By way of example, the controller 420 may include one or more general purpose microprocessors or microcontrollers, programmable logic devices, or application specific integrated circuits. The controller 420 may also include one or more discrete and/or analog circuit components operating in conjunction with the one or more integrated circuits, and may include or have access to one or more memory or storage elements operable to store executable instructions, data, or both. The control module 422 may be a hardware or software module specifically dedicated to enabling the controller 420 to control the hydraulic controller 410 as described herein.

Another control system 426, illustrated in FIG. 4C, is similar to the control system 418, but includes additional hydraulic circuit components, such as hydraulic accumulators 428. In some embodiments, each of the support assemblies 114 may include a single hydraulic actuator 404 that both raises and lowers the chassis 104 and provides suspension functions, as explained below. Such hydraulic systems may require specialized hydraulic circuit components such as the hydraulic accumulators 428.

Figure 5A:
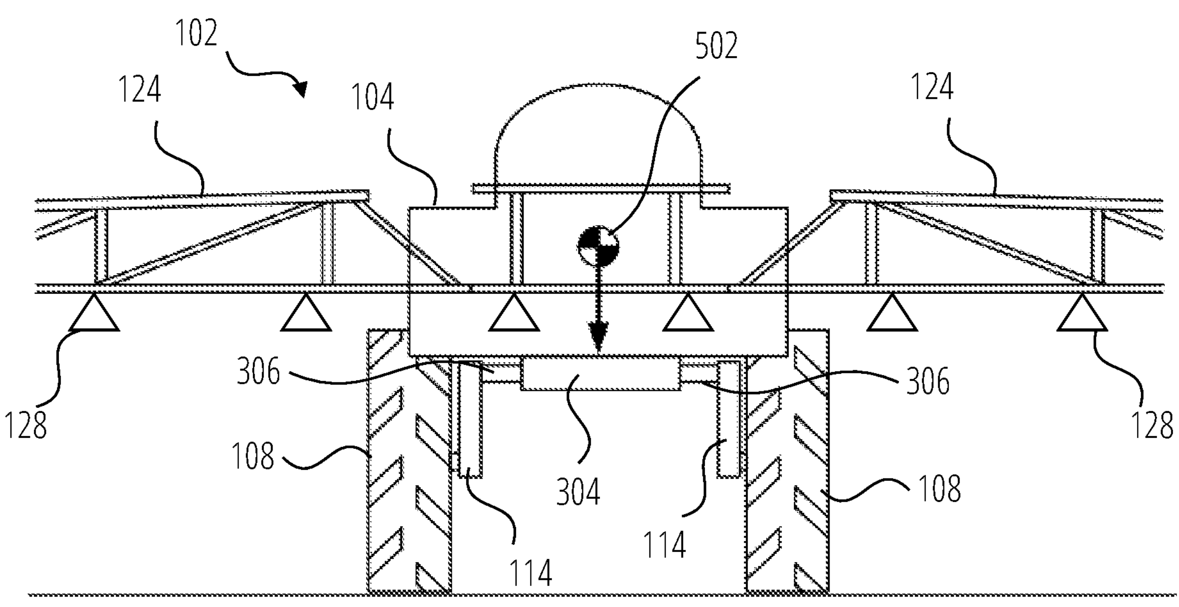
FIG. 5A is a simplified rear view of the vehicle of FIG. 1 traveling over level ground.

FIG. 5A is a simplified rear view of the vehicle 102 traveling over a level ground surface with the boom 124 extended (though outer extents of the boom 124 are omitted from view for clarity). The chassis 104 is centered between the wheels 108 because the inner axles 306 are each extended from the outer axle 304 an approximately equivalent amount. Thus, the vehicle 102 has a center of gravity 502 at approximately the lateral midpoint between opposite wheels 108.

Figure 5B:
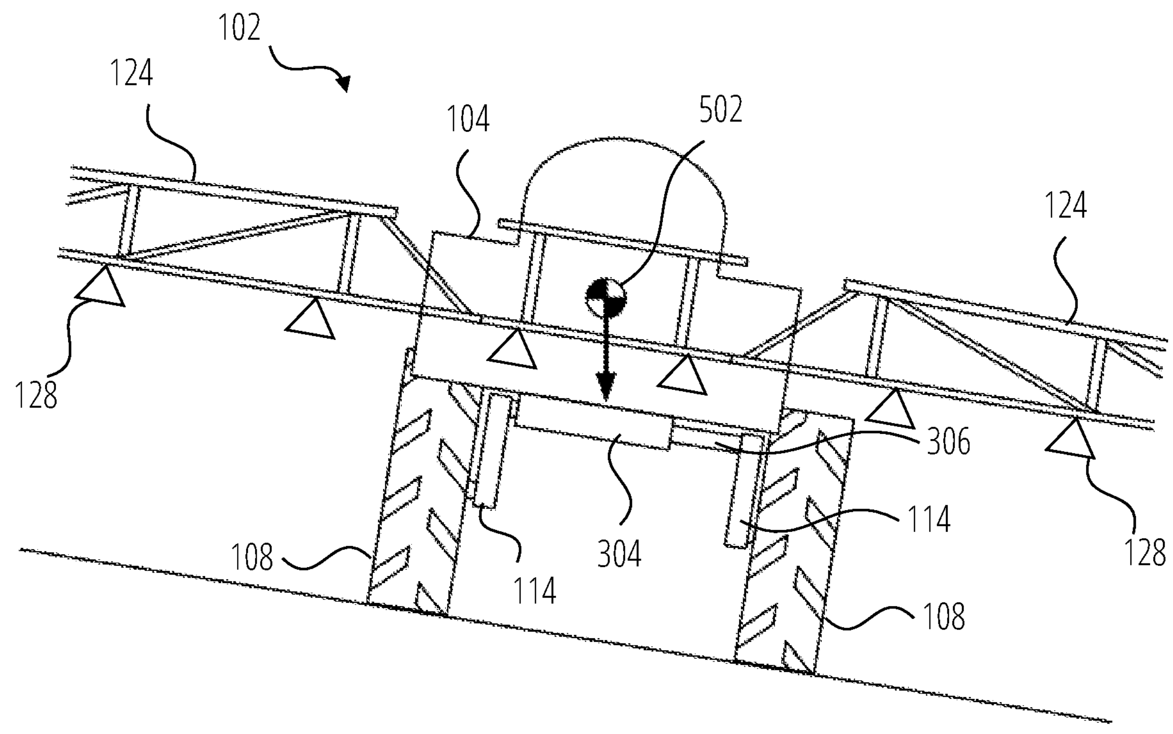
FIG. 5B is a simplified rear view of the vehicle of FIG. 1 traveling over a sloped ground surface.

FIG. 5B is a simplified rear view of the vehicle 102 traveling over a sloped ground surface with the boom 124 extended. The inner axles 306 on the left side of vehicle 102 have been retracted, and the inner axles 306 on the right side have been extended, such that the chassis 104 is centered to the left of the midpoint between the wheels 108. Thus, the center of gravity 502 is shifted to the left (up the slope) as compared to a centered chassis 104. This shift may improve the stability of the vehicle 102 on the slope, which becomes increasingly important when the chassis 104 is raised. The center of gravity 502 may be shifted without changing the track width of the vehicle 102 because the inner axles 306 on one side can extend while the inner axles 306 on the other side retract. Because the center of gravity 502 moves toward the up-slope wheels 108, the center of gravity 502 is also moved closer to the midpoint between opposite wheels 108.

Though the vehicle 102 is shown with the outer axles 304 connected to the chassis 104 and the inner axles 306 connected to the support assemblies 114, the inner axles 306 could alternatively be connected to the chassis 104, and the outer axles 304 could be connected to the support assemblies 114. In some embodiments, the axles 116 may include other adjustment mechanisms in which the support assemblies 114 can be laterally moved relative to the chassis 104.

The controller 420 (FIG. 4B) may be configured to receive a signal from the sensor 126 correlated to the orientation of the chassis 104 relative to gravity. The controller 420 may be configured to move the chassis 104 laterally along the axle 116 responsive to the signal, and without changing the track width between the wheels 108 on opposing sides of the chassis 104. In some embodiments, the controller 420 may automatically perform actions to cause the chassis 104 to move laterally without input from the operator of the vehicle 102. In other embodiments, the operator may initiate the movement of the chassis 104 after observing a representation of the orientation detected by the sensor 126 (e.g., on a display or other indicator in the instrument panel 210 or the control panel 212). The controller 420 may move the chassis 104 while the support assemblies 114 and wheels 108 remain stationary. In other embodiments, the controller 420 may move the chassis 104 while the vehicle 102 is in motion.

Figure 6:
FIG. 6 is a simplified flow chart illustrating a method of operating an agricultural vehicle, such as the vehicle shown in FIG. 1.
Figure 6:
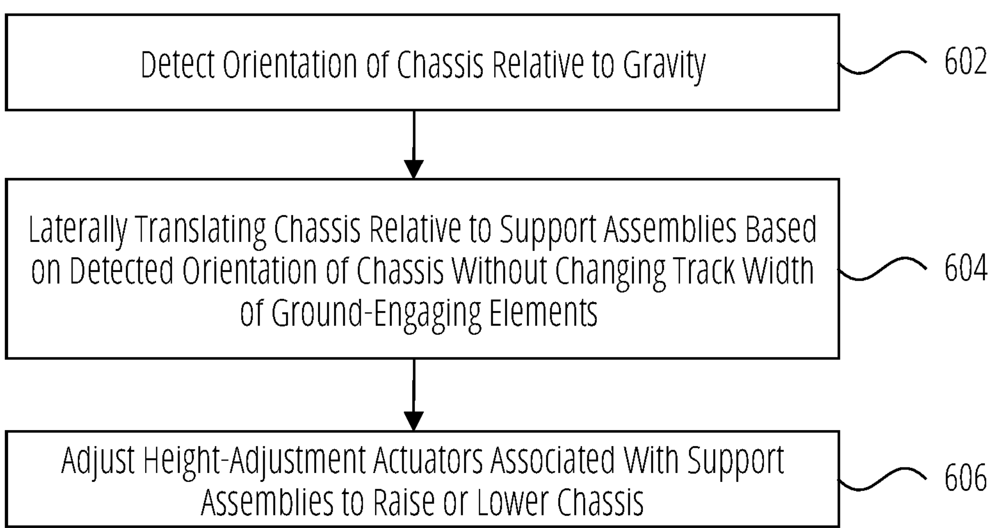

FIG. 6 is a simplified flow chart illustrating a method 600 of operating a vehicle, such as the vehicle 102 shown in FIG. 1. The vehicle has a chassis, ground-engaging elements (e.g., wheels) configured to support the chassis above a ground surface, and support assemblies (which may be height-adjustable) supporting the chassis on the ground-engaging elements. The vehicle travels over ground that may not be level.

As shown in block 602, an orientation of the chassis relative to gravity is detected by a sensor. The sensor transmits a signal correlated to the orientation to a controller.

In block 604, the chassis is laterally translated relative to the support assemblies based on the detected orientation of the chassis, without changing a track width of the ground-engaging elements. The chassis is typically moved toward an up-slope position to improve stability of the vehicle on sloping ground.

In block 606, height-adjustment actuators (if present) associated with the support assemblies may be adjusted to raise or lower the chassis.

Though depicted as a flow chart, the actions in FIG. 6 may be performed concurrently, and in some embodiments, some actions may be omitted.

Figure 7:
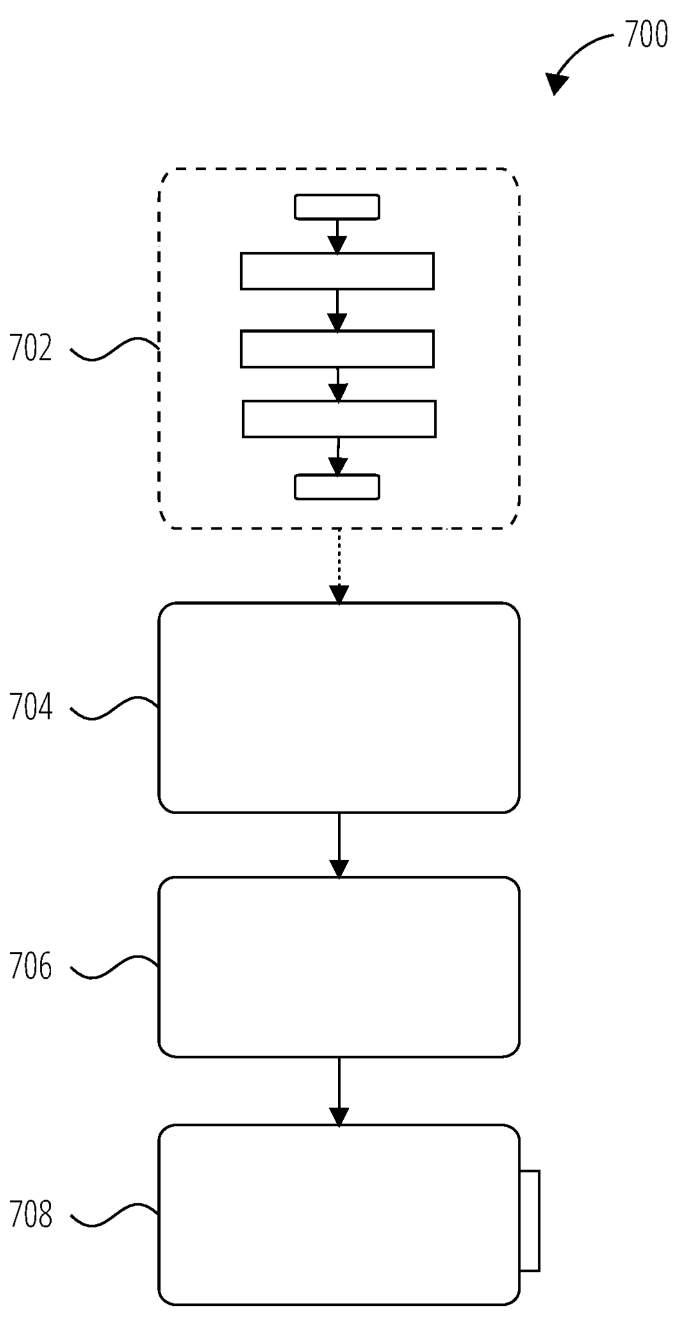
FIG. 7 illustrates an example computer-readable storage medium comprising processor-executable instructions configured to embody one or more of the methods of operating vehicle, such as the method illustrated in FIG. 6.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 7, wherein an implementation 700 includes a computer-readable storage medium 702 (e.g., a flash drive, CD-R, DVD-R, application-specific integrated circuit (ASIC), field-programmable gate array (FPGA), a platter of a hard disk drive, etc.), on which is computer-readable data 704. This computer-readable data 704 in turn includes a set of processor-executable instructions 706 configured to operate according to one or more of the principles set forth herein. In some embodiments, the processor-executable instructions 706 may be configured to cause a computer associated with the vehicle 102 (FIG. 1) to perform operations 708 when executed via a processing unit, such as at least some of the example method 600 depicted in FIG. 6. In other embodiments, the processor-executable instructions 706 may be configured to implement a system, such as at least some of the example vehicle 102 depicted in FIG. 1. That is, the control environment 202 may include or be connected to the implementation 700 of FIG. 7. Many such computer-readable storage media may be devised by those of ordinary skill in the art that are configured to operate in accordance with one or more of the techniques described herein.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various vehicle types and configurations.

What is claimed is:

1. A method of operating a vehicle comprising a chassis, a plurality of ground-engaging elements configured to support the chassis above a ground surface, and a plurality of support assemblies supporting the chassis on the ground-engaging elements, the method comprising:

detecting an orientation of the chassis relative to gravity; and laterally translating the chassis relative to the support assemblies by extending axles on a first side of the chassis while retracting axles on a second, opposite side of the chassis based on the detected orientation of the chassis without changing a track width of the ground-engaging elements.

2. The method of claim 1, wherein detecting an orientation of the chassis relative to gravity comprises detecting the orientation with a level sensor.

3. The method of claim 1, wherein detecting an orientation of the chassis relative to gravity comprises detecting the orientation with an inertial sensor.

4. The method of claim 1, wherein detecting an orientation of the chassis relative to gravity comprises detecting the orientation based on GPS signals.

5. The method of claim 1, wherein laterally translating the chassis relative to the support assemblies comprises transmitting a command from a control panel to a controller.

6. The method of claim 5, wherein the control panel is located at location selected from the group consisting of inside an operator cab, on an exterior of the chassis, and in a mobile device.

7. The method of claim 1, wherein laterally translating the chassis relative to the support assemblies comprises moving a center of gravity of the vehicle toward a midpoint between ground-engaging elements.

8. The method of claim 1, further comprising adjusting height-adjustment actuators associated with the support assemblies to raise or lower the chassis.

9. A vehicle comprising:

a chassis;

a plurality of ground-engaging elements configured to support the chassis above a ground surface;

a plurality of support assemblies supporting the chassis on the ground-engaging elements;

a plurality of adjustable axles configured to change a lateral distance from the chassis to each of the support assemblies;

at least one sensor configured to detect an orientation of the chassis relative to gravity; and a controller configured to receive a signal from the sensor correlated to the orientation and to move the chassis laterally along the axles by extending the axles on a first side of the chassis while retracting the axles on a second, opposite side of the chassis responsive to the signal without changing a track width between ground-engaging elements on opposing sides of the chassis.

10. The vehicle of claim 9, further comprising:

an application system carried by the chassis, the application system comprising:

a liquid holding tank; and a plurality of nozzles spaced along a boom, wherein the nozzles are configured to deliver liquid from the liquid holding tank to the ground surface.

11. The vehicle of claim 9, wherein the controller is configured to automatically move the chassis laterally along the axles after receiving the signal from the at least one sensor.

12. The vehicle of claim 9, wherein the controller is configured to move the chassis laterally while the support assemblies remain stationary.

13. The vehicle of claim 9, wherein each support assembly comprises a height-adjustment actuator.

14. The vehicle of claim 13, wherein the height-adjustment actuators each comprise hydraulic cylinders connected to a common fluid source via a respective control valve.

15. A non-transitory computer-readable storage medium, the computer-readable storage medium including instructions that when executed by a computer associated with a vehicle comprising a chassis, a plurality of ground-engaging elements supporting the chassis above a ground surface, and a plurality of adjustable axles supporting the chassis on the ground-engaging elements, cause the vehicle to:

detect an orientation of the chassis relative to gravity; and laterally translate the chassis relative to the ground-engaging elements by extending the axles on a first side of the chassis while retracting the axles on a second, opposite side of the chassis based on the detected orientation of the chassis without changing a track width of the ground-engaging elements.

* * * * *